(12) United States Patent
Asher et al.

(10) Patent No.: US 10,891,829 B2
(45) Date of Patent: Jan. 12, 2021

(54) SYSTEM AND METHOD FOR GENERATING CUSTOMIZED ODDS BET FOR AN EVENT

(71) Applicant: CANTOR INDEX LLC, New York, NY (US)

(72) Inventors: Joseph M. Asher, Las Vegas, NV (US); John W. Bristow, Surrey (GB); Howard W. Lutnick, New York, NY (US)

(73) Assignee: CANTOR INDEX, LLC, New York, NY (US)

( * ) Notice: Subject to any disclaimer, the term of this patent is extended or adjusted under 35 U.S.C. 154(b) by 0 days.

(21) Appl. No.: 16/377,535

(22) Filed: Apr. 8, 2019

(65) Prior Publication Data

US 2019/0236910 A1 Aug. 1, 2019

Related U.S. Application Data

(63) Continuation of application No. 14/179,806, filed on Feb. 13, 2014, now Pat. No. 10,290,186, which is a continuation of application No. 13/540,033, filed on Jul. 2, 2012, now Pat. No. 8,651,948, which is a continuation of application No. 10/687,302, filed on Oct. 14, 2003, now Pat. No. 8,210,926.

(Continued)

(51) Int. Cl.
*G06Q 50/34* (2012.01)
*G07F 17/32* (2006.01)
*G06Q 40/04* (2012.01)

(52) U.S. Cl.
CPC ......... *G07F 17/3288* (2013.01); *G06Q 40/04* (2013.01); *G06Q 50/34* (2013.01); *G07F 17/32* (2013.01)

(58) Field of Classification Search
CPC .................. G06Q 50/34; G07F 17/3288
See application file for complete search history.

(56) References Cited

U.S. PATENT DOCUMENTS 4,695,053 A 9/1987 Vazquez, Jr. et al.
4,874,177 A 10/1989 Girardin
(Continued)

FOREIGN PATENT DOCUMENTS

GB 1574447 9/1980
GB 2180675 4/1987
(Continued)

OTHER PUBLICATIONS

"NTRA All-Star Jockey Championship Special Wagers," date unknown, (3 pages).
(Continued)

*Primary Examiner* — Steven J Hylinski

(57) ABSTRACT

A system for managing bets comprises a memory and a processor. The memory stores information associated with a field of participants for an event, each participant associated with particular odds for the event. The processor receives a bet that a lead participant from the field of participants will finish in a particular subset of finishing positions in the event, wherein the bet is associated with customized odds. The processor further select one or more additional participants from the field of participants to add to the bet such that the odds associated with the lead participant combined with the odds associated with the one or more selected additional participants at least approximates the customized odds for the bet.

18 Claims, 5 Drawing Sheets

Related U.S. Application Data

(60) Provisional application No. 60/484,316, filed on Jul. 1, 2003.

(56) References Cited

U.S. PATENT DOCUMENTS

| | | | |
|---|---|---|---|
| 4,962,950 | A | 10/1990 | Champion |
| 5,586,937 | A | 12/1996 | Menashe |
| 5,713,793 | A | 2/1998 | Holte |
| 5,743,525 | A | 4/1998 | Haddad |
| 5,749,785 | A | 5/1998 | Rossides |
| 5,830,068 | A | 11/1998 | Brenner et al. |
| 5,888,136 | A | 3/1999 | Herbert |
| 6,004,211 | A | 12/1999 | Brenner et al. |
| 6,068,552 | A | 5/2000 | Walker et al. |
| 6,099,409 | A | 8/2000 | Brenner et al. |
| 6,113,492 | A | 9/2000 | Walker et al. |
| 6,126,543 | A | 10/2000 | Friedman |
| 6,152,822 | A | 11/2000 | Herbert |
| 6,296,569 | B1 | 10/2001 | Congello, Jr. |
| 6,309,307 | B1 | 10/2001 | Krause et al. |
| 6,325,721 | B1 | 12/2001 | Miyamoto et al. |
| 6,331,148 | B1 | 12/2001 | Krause et al. |
| 6,358,150 | B1 | 3/2002 | Mir et al. |
| 6,443,841 | B1 | 9/2002 | Rossides |
| 6,450,887 | B1 | 9/2002 | Mir et al. |
| 6,527,270 | B2 | 3/2003 | Maksymec et al. |
| 6,554,708 | B1 | 4/2003 | Brenner et al. |
| 6,554,709 | B1 | 4/2003 | Brenner et al. |
| 7,607,975 | B2 | 10/2009 | Sato et al. |
| 7,774,259 | B1 | 8/2010 | Satterfield et al. |
| 8,210,926 | B2 | 7/2012 | Asher et al. |
| 8,651,948 | B2 | 2/2014 | Asher et al. |
| 10,290,186 | B2 | 5/2019 | Asher et al. |
| 2001/0034268 | A1 | 10/2001 | Thomas et al. |
| 2001/0039209 | A1 | 11/2001 | DeWeese et al. |
| 2002/0058548 | A1 | 5/2002 | Stronach |
| 2002/0115488 | A1 | 8/2002 | Berry et al. |
| 2003/0054870 | A1 | 3/2003 | Sato et al. |
| 2003/0144057 | A1 | 7/2003 | Brenner et al. |
| 2003/0195841 | A1 | 10/2003 | Ginsberg et al. |
| 2019/0236910 | A1 | 8/2019 | Asher et al. |

FOREIGN PATENT DOCUMENTS

| | | |
|---|---|---|
| GB | 2299425 | 10/1996 |
| WO | 2000/079442 | 12/2000 |
| WO | 2001/065508 | 9/2001 |
| WO | 2001/077964 | 10/2001 |

OTHER PUBLICATIONS

"Wagering Information; Straight or Basic Wagers," Lone Star Park at Grand Prairie: Player's Guide, http://www.lonestarpark.com/bet_info.asp, printed on Jul. 8, 2003 (3 pages).
"Wagering Information; Straight or Basic Wagers," NTRA.com, http://www.ntra.com/news.asp?type=playthehorses&id=4799, printed on Jul. 8, 2003 (3 pages).
"Glossary of Terms," NTRA.com, http://www.ntra.com/news.asp?type=playthehorses&id=4797, printed on Jul. 8, 2003 (3 pages).
"The Basics of Horseplay," NTRA.com, http://www.ntra.com/news.asp?type=playthehorses&id=4795, printed on Jul. 8, 2003 (2 pages).
"AU Examiners report for AU Application No. 2007230480; 2 pages; dated Dec. 24, 2008".
CA Examination Report for CA Application No. 2531477; 4 pages; dated Sep. 7, 2011.
AU Examination Report for AU Application No. 2011200054; 2 pages; dated Feb. 9, 2012.
AU Notice of Acceptance for AU Application No. 2011200054; 3 pages; dated Apr. 27, 2012.
U.S. Office Action for U.S. Appl. No. 10/687,302, 14 pages; dated Nov. 9, 2010.
U.S. Final Office Action for U.S. Appl. No. 10/687,302, 14 pages; dated Jul. 19, 2011.
U.S. Notice of Allowance for U.S. Appl. No. 10/687,302, 16 pages; dated Feb. 21, 2012.
European Search Report for Patent Application No. GB 0324863.0, 3 pages, dated Jan. 25, 2004.
Notification of Transmittal of the International Search Report or the Declaration for Int'l App'l No. PCT/US2003/041224; 5 pages; dated Mar. 18, 2005.
Australian Examination Report for Patent Application No. 2003257910; 2 pages; dated Jul. 13, 2005.
European Examination Report for Patent Application No. GB 0324863.0, 5 ages, dated May 4, 2006.
New Zealand Racing Board; Opposition to New Zealand Patent Application No. 530447 in the name of Cantor Index LLC, Statement of Case; 8 pages, Oct. 31, 2005.
Hedging Dutching Horseracing Handicapping; Cover your assets—Hedge your bets; http://web.archive.org/web/20021207064141/http://crowncity.com/speedplus/hedgehog.html; 2 pages, Oct. 31, 2005.
Hedgehog examples; http://web.archive.org/web/20021207070248/crowncity.com/speedplus/hhexamp.html; 6 pages, Oct. 31, 2005.
PCT Search Report for PCT/US03/41224, 7 pages, dated Mar. 18, 2005. The Patent Office Search Report from Int'l App'l No. GB 0320232.2, 6 pages, dated Dec. 17, 2003.
Bet with the People Who Know Racing, Racing Daily Forum, 15 pages, Jul. 24, 2001.
Quote of the Day, Bet of the Day, London Times, 1 page, Jul. 30, 2003.
UK Intellectual Property Office Office Action for App'l No. GB0324863.0, 3 pages, dated Aug. 10, 2007.
UK Intellectual Property Office Office Action for App'l No. GB2403564, 5 pages, dated Aug. 10, 2007.
NZ Examination Report for NZ App'l No. 530447; 1 page; dated Jul. 5, 2004.
CA Examination Report for CA Application No. 2531477; 3 pages; dated Jul. 22, 2013.
U.S. Notice of Allowance for U.S. Appl. No. 13/540,033; dated Oct. 8, 2013; 9 pages.
AU Patent Examination Report No. 1 for App. No. 2012211341; dated Apr. 24, 2014; 3 pages.
EP Examination Report for App. No. 03800159.0; dated Aug. 14, 2014; 3 pages.
CA Examiners Requisition for App. No. 2,531,477; dated Jan. 28, 2015; 5 pages.
CA Examiners Requisition for App. No. 2,531,477; dated Dec. 7, 2015; 6 pages.
AU Patent Examination Report No. 1 for App. No. 2016200410; dated Nov. 1, 2016; 3 pages.
AU Patent Examination Report No. 2 for App. No. 2016200410; dated Oct. 10, 2017; 3 pages.
CA Final Office Action for App. No. 2,531,477; dated Apr. 10, 2018; 7 pages.

| 102 ODDS | 104 PERCENTAGE |
|---|---|
| 2-5 | 72 |
| 3-5 | 62 |
| 4-5 | 55 |
| 1-1 | 50 |
| 6-5 | 45 |
| 7-5 | 41 |
| 8-5 | 38 |
| 9-5 | 35 |
| 2-1 | 33 |
| 5-2 | 28 |
| 3-1 | 25 |
| 7-2 | 22 |
| 4-1 | 20 |
| 9-2 | 18 |
| 5-1 | 16 |
| 6-1 | 14 |
| 7-1 | 12 |
| 8-1 | 11 |
| 9-1 | 10 |
| 10-1 | 9 |
| 12-1 | 7 |
| 15-1 | 6 |
| 20-1 | 4 |
| 25-1 | 3 |
| 30-1 | 3 |
| 40-1 | 2 |
| 50-1 | 2 |
| 60-1 | 1 |
| 100-1 | 1 |

FIG. 3A

GROUP OF PARTICIPANTS 80

| EVENT | PARTICIPANTS AND ODDS | CUSTOMIZED ODDS | BET AMOUNT | LEAD PARTICIPANT 82 AND BET AMOUNT ALLOCATION | ADDITIONAL PARTICIPANTS 84 AND BET AMOUNT ALLOCATIONS | PAYOUT IF ANY ONE OF THE GROUP OF PARTICIPANTS 80 WINS THE EVENT | TOTAL RETURN IF ANY ONE OF THE GROUP OF PARTICIPANTS 80 WINS THE EVENT |
|---|---|---|---|---|---|---|---|
| RACE 1 | HORSE 1 -- 12-1<br>HORSE 2 -- 7-2<br>HORSE 3 -- 2-1<br>HORSE 4 -- 9-2<br>HORSE 5 -- 6-1<br>HORSE 6 -- 15-1<br>HORSE 7 -- 20-1<br>HORSE 8 -- 40-1<br>HORSE 9 -- 9-1<br>HORSE 10 -- 25-1 | 1-TO-1 | $200 TO WIN | HORSE 3 -- $133 | HORSE 5 -- $57<br>HORSE 8 -- $10 | HORSE 3 -- $266<br>HORSE 5 -- $342<br>HORSE 8 -- $400 | HORSE 3 -- $266 + $133 = $399<br>HORSE 5 -- $342 + $57 = $399<br>HORSE 8 -- $400 + $10 = $410 |
| RACE 1 | HORSE 1 -- 12-1<br>HORSE 2 -- 7-2<br>HORSE 3 -- 2-1<br>HORSE 4 -- 9-2<br>HORSE 5 -- 6-1<br>HORSE 6 -- 15-1<br>HORSE 7 -- 20-1<br>HORSE 8 -- 40-1<br>HORSE 9 -- 9-1<br>HORSE 10 -- 25-1 | 1-TO-1 | $100 TO WIN | HORSE 2 -- $44 | HORSE 4 -- $36<br>HORSE 9 -- $20 | HORSE 2 -- $154<br>HORSE 4 -- $162<br>HORSE 9 -- $180 | HORSE 2 -- $154 + $44 = $198<br>HORSE 4 -- $162 + $36 = $198<br>HORSE 9 -- $180 + $20 = $200 |

FROM FIG. 3A

| | | | | | |
|---|---|---|---|---|---|
| RACE 1 HORSE 1 -- 12-1<br>HORSE 2 -- 7-2<br>HORSE 3 -- 2-1<br>HORSE 4 -- 9-2<br>HORSE 5 -- 6-1<br>HORSE 6 -- 15-1<br>HORSE 7 -- 20-1<br>HORSE 8 -- 40-1<br>HORSE 9 -- 9-1<br>HORSE 10 -- 25-1 | 2-TO-1 | $100 TO WIN | HORSE 4 -- $55 | HORSE 7 -- $14.50<br>HORSE 9 -- $30.50 | HORSE 4 -- $247.50<br>HORSE 7 -- $290<br>HORSE 9 -- $274.50 | HORSE 4 -- $55 + 247.50<br>= $302.50<br>HORSE 7 -- $14.50 + $290<br>= $304.50<br>HORSE 9 -- $30.50 + $274.50<br>= $304.50 |
| RACE 2 HORSE 1 -- 3-1<br>HORSE 2 -- 2-1<br>HORSE 3 -- 66-1<br>HORSE 4 -- 5-1<br>HORSE 5 -- 6-1<br>HORSE 6 -- 15-1<br>HORSE 7 -- 7-1<br>HORSE 8 -- 25-1<br>HORSE 9 -- 20-1<br>HORSE 10 -- 15-1 | 1-TO-1 | $100 TO WIN | HORSE 1 -- $50 | HORSE 7 -- $25<br>HORSE 10 -- $12.50<br>HORSE 9 -- $9.50<br>HORSE 3 -- $3 | HORSE 1 -- $150<br>HORSE 7 -- $175<br>HORSE 10 -- $187.50<br>HORSE 9 -- $190<br>HORSE 4 -- $198 | HORSE 1 -- $150 + $50<br>= $200<br>HORSE 7 -- $175 + $25<br>= $200<br>HORSE 10 -- $187.50 + $12.50<br>= $200<br>HORSE 9 -- $190 + $9.50<br>= $199.50<br>HORSE 4 -- $198 + $3 = $201 |

SYSTEM AND METHOD FOR GENERATING CUSTOMIZED ODDS BET FOR AN EVENT

CROSS REFERENCE TO RELATED APPLICATION

This application is a continuation of U.S. patent application Ser. No. 14/179,806, filed Feb. 13, 2014, which is a continuation of U.S. patent application Ser. No. 13/540,033, filed Jul. 2, 2012 (now U.S. Pat. No. 8,651,948), which is a continuation of U.S. patent application Ser. No. 10/687,302, filed Oct. 14, 2003 (now U.S. Pat. No. 8,210,926), which is related to and claims the benefit of U.S. Provisional Application No. 60/484,316 filed Jul. 1, 2003, each of which is hereby incorporated by reference herein in its entirety.

TECHNICAL FIELD OF THE INVENTION

This invention relates in general to betting on events and, more particularly, to a system and method for generating customized odds bets for an event.

BACKGROUND OF THE INVENTION

Wagering on sporting events, such as horse races, for example, is a large and growing industry in many parts of the world. Various types of betting products or systems are available for various types of sporting events. For example, typical horse racing bets allow bettors to bet on a single horse or on several horses in a particular race or series of races. For instance, a bettor can bet on a particular horse to finish first (win), finish in the top two (place), or finish in the top three (show). A bettor may also make various combination bets with multiple horses, such as an exacta bet (covering the top two horses in order) or a trifecta bet (covering the top three horses in order). In addition, a bettor may bet on a series of races, such as the daily double (winners of two consecutive races), the pick-three (winners of three consecutive races), and the pick-six (winners of six consecutive races), for example.

In a pari-mutuel betting system, all bets regarding a particular event are aggregated, a commission (or "takeout") is taken by the track, and the remainder is distributed among the winning bettors. For example, pari-mutuel betting systems are commonly used in North America (and other various places throughout the world) for betting on horse races.

SUMMARY OF THE INVENTION

In one embodiment, a method of managing bets includes identifying a field of participants for an event, each participant associated with particular odds to finish in a particular position in the event. The method continues by identifying customized odds for a bet, and identifying a lead participant from the field of participants. The method proceeds by selecting one or more additional participants from the field of participants such that the odds associated with the lead participant combined with the odds associated with the one or more selected additional participants at least approximates the customized odds for the bet. The method concludes by establishing the bet on a group of participants that comprises the lead participant and the additional participants.

In another embodiment, a system for managing bets comprises a memory and a processor coupled to the memory. The memory stores information associated with a field of participants for an event, each participant associated with particular odds for the event. The processor receives a bet that a lead participant from the field of participants will finish in a particular subset of finishing positions in the event, wherein the bet is associated with customized odds. The processor further select one or more additional participants from the field of participants to add to the bet such that the odds associated with the lead participant combined with the odds associated with the one or more selected additional participants at least approximates the customized odds for the bet.

In yet another embodiment, a method of managing bets comprises identifying a field of participants for an event, each participant associated with particular odds to finish in a particular subset of finishing positions in the event. The method continues by identifying customized odds for a bet. The method proceeds by selecting a plurality of participants from the field of participants such that the odds associated with each of the selected participants combines to at least approximate the customized odds for the bet. The method concludes by establishing the bet on the selected participants.

Various embodiments of the present invention may benefit from numerous advantages. It should be noted that one or more embodiments may benefit from some, none, or all of the advantages discussed below. The customized odds bet described herein will appeal to a bettor who prefers a participant that has more than the customized odds (e.g., more than 1-1 odds for an even money bet) to finish in a particular subset of finishing positions in an event (e.g., win, place, show, etc. for a horse race) and is willing to relinquish some of her potential winnings in order to have additional participants included in the bet. Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIGS. 3A-3B illustrate a table depicting example bet data for various customized odds bets;

DETAILED DESCRIPTION OF EXAMPLE EMBODIMENTS OF THE INVENTION

Figure 1:
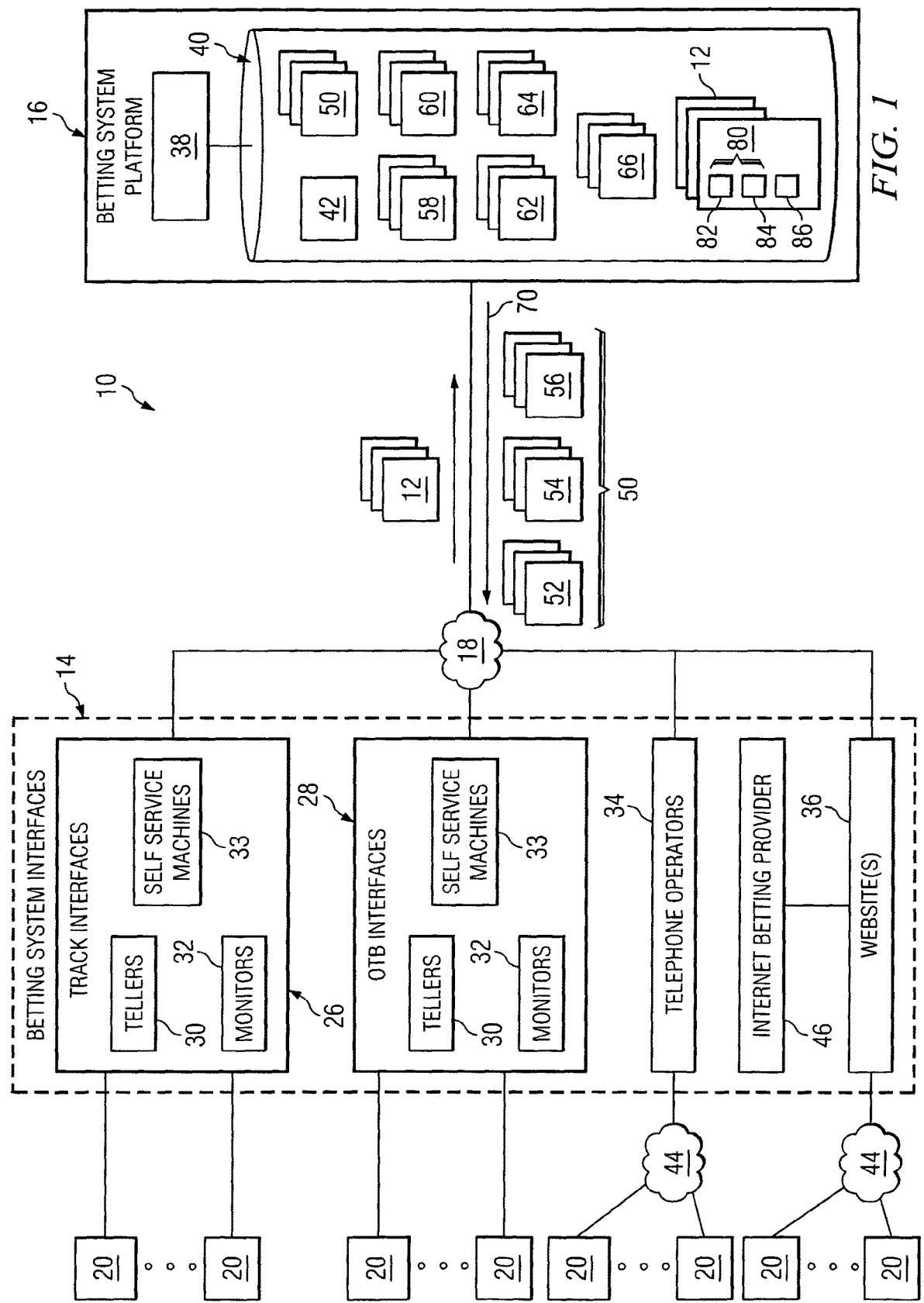
FIG. 1 illustrates a system for establishing, managing, and paying customized odds bets in accordance with one embodiment of the present invention.

FIG. 1 illustrates an example system 10 for establishing, managing, and paying bets 12, such as customized odds bets 12, in accordance with one embodiment of the present invention. System 10 includes one or more betting system interfaces 14 and a betting system platform 16 coupled by one or more communication networks 18. In general, one or more clients 20 may receive betting information (such as event times, betting rules, betting options and odds, for example) and/or place bets 12 via betting system interfaces 14. Betting system interfaces 14 communicate such bets 12 received from clients 20 to betting system platform 16. Betting system platform 16 processes and stores bets 12, determines appropriate odds and payouts, and communicates such odds and payouts to one or more of the betting system interfaces 14.

A customized odds bet 12 is a bet that a particular one or a subset of a group of participants 80 selected from a field of participants will finish in a predetermined subset of finishing positions of a pari-mutuel wagering event, such as a horse race, dog race, auto race, jai alai, or golf tournament, for example. The bet 12 is referred to as a customized odds bet 12 because the odds associated with the bet 12, and therefore the total return, may be customized by a bettor or system 10. Therefore, a bettor or system 10 can identify a set of odds for a bet 12 on an event, also referred to as customized odds 86, and then system 10 can form a group of participants 80 for the bet 12 that will have overall odds that approximate the customized odds 86. System 10 selects the group of participants 80 for the bet 12 from the field of participants in the event based upon the odds associated with each individual participant.

For example, a bettor or system 10 may desire a bet 12 having customized odds 86 of 1-1, also referred to as an even money bet 12. In such a case, system 10 can form a group of participants 80 for the even money bet 12 such that the overall odds for the bet 12 at least approximate 1-1. In another example, a bettor or system 10 may desire a bet 12 having customized odds 86 of 6-5, 2-1, or 3-1, etc. System 10 would then form an appropriate group of participants 80 for a customized odds bet 12 at least approximating the desired customized odds 86. An advantage of system 10 is that it can construct bets 12 based on a combination of participants such that the bets 12 are associated with overall odds, such as customized odds 86, that may not otherwise be available for a bet 12 on any individual participant.

The group of participants 80 for the customized odds bet 12 is formed, in one embodiment, by identifying a lead participant 82 from the field of participants. The lead participant 82 is associated with particular odds that are more than the customized odds 86. For example, if the customized odds 86 for a particular bet 12 are 1-1, then the lead participant 82 would have odds more than 1-1 such as, for example, 2-1, 3-1, 4-1, etc. In one embodiment, the lead participant 82 for the customized odds bet 12 is selected by a bettor. In this embodiment, the lead participant 82 may be the preferred participant of the bettor. In another embodiment, the lead participant 82 for the customized odds bet 12 is selected by the system 10. System 10 selects one or more additional participants 84 from the field of participants to be added to the group of participants 80 to construct a bet 12 having overall odds that at least approximate the customized odds 86. In particular instances, system 10 may form a group of participants 80 for a bet 12 having overall odds that exactly equal the customized odds 86, but such precision is not necessary for the bet 12 to be established by system 10.

The selection of the additional participants 84 is made based at least in part upon the odds associated with the lead participant 82 and the odds associated with each of the other participants remaining in the field of participants. Therefore, the group of participants 80 for the customized odds bet 12 comprises the lead participant 82 and the one or more additional participants 84 selected by system 10. Although the remainder of this specification is described in terms of a group of participants 80 having a lead participant 82 and additional participants 84, system 10 may form a group of participants 80 for the customized odds bet 12 without specifically designating a lead participant 82 or additional participants 84. In this embodiment, for example, a bettor would place a customized odds bet 12 having particular customized odds 86 and system 10 would subsequently determine and notify the bettor as to which participants were selected to form the group of participants 80 for the bet 12.

The customized odds bet 12 is associated with a bet amount 52. Bet 12 comprises a customized odds bet 12 because the odds to finish in a particular subset of finishing positions of an event for the lead participant 82 combined with the corresponding odds associated with each of the additional participants 84 of the group of participants 80 at least approximate the customized odds 86. If any one of the group of participants 80 finishes in the particular subset of finishing positions associated with the bet 12, the total return associated with the bet 12 will be based upon the customized odds 86. For an even money bet 12 to win the event, for example, if any one of the group of participants 80 wins the event, the total return associated with the bet 12 will approximate twice the bet amount 52 (e.g., the bettor wins an amount approximating the bet amount 52 and also receives back the original bet amount 52). The customized odds bet 12 described herein will appeal to a bettor who prefers a participant that has more than the customized odds (e.g., more than 1-1 odds for an even money bet 12) to finish in a particular subset of finishing positions in an event and is willing to relinquish some of her potential winnings were that participant to finish in a winning position in order to have additional participants included in the bet.

To include the additional participants 84 in the group of participants 80 for the customized odds bet 12, system 10 allocates a portion of the bet amount 52 to each of the participants in the group of participants 80. The allocation is based at least in part upon the odds associated with each of the participants in the group of participants 80. In some embodiments, system 10 selects the additional participants 84 to be added to the group of participants 80 while wagering on the event is ongoing. In such an embodiment, the current odds associated with each participant takes into account the portion of bet amount 52 to be allocated among the participants in the group of participants 80.

In particular instances, it may be possible to form multiple customized odds bets 12 based upon different groups of participants 80 for the same or different outcome of an event (e.g., win, place, show for a horse race). For example, a first customized odds bet 12 may be based upon a group of participants 80 comprising a first lead participant 82 and particular additional participants 84. Moreover, a second customized odds bet 12 for the same or different outcome of the same event may be based upon a different group of participants 80 comprising the same or different lead participant 82 and the same or different additional participants 84 (so long as at least one participant in the group of participants 80 for the second customized odds bet 12 is different from the participants in the group of participants 80 for the first customized odds bet 12).

Betting pools 54 are formed for an event based on the placement of various types of straight bets 12, customized odds bets 12, or any other bets 12 that are established for the event. For example, various bets 12 may be made based upon the finishing positions of a particular horse in a horse race, such as whether the horse will win, place, or show in the horse race. System 10 forms separate betting pools 54 for each of these types of bets 12 and establishes odds for each participant to finish in each of these finishing positions based upon the proportion of money bet on that participant versus the overall amount of money accumulated in the relevant betting pool 54.

Various bets 12 may also be made based upon the finishing positions of various combinations of horses in a horse race, such as, for example, exacta bets (covering the top two horses in exact order), trifecta bets (covering the top three horses in exact order), superfecta bets (covering top four horses in exact order), and quinella bets (covering the top two horses in any order), etc. System 10 also forms separate betting pools 54 for each of these types of bets 12 and establishes odds for each combination of participants to finish in each of these finishing positions based upon the proportion of money bet on a particular combination of participants versus the overall amount of money accumulated in the relevant betting pool 54. Moreover, system 10 may treat a combination of participants as a single participant (e.g., lead participant 82 or additional participant 84) for purposes of establishing these types of customized odds bets 12.

In one embodiment, for example, to construct a customized odds bet 12 for an exacta bet in a particular horse race, system 10 may treat the combination of horses 1 and 3 as lead participant 82, and the combination of horses 4 and 5 and horses 7 and 9 as additional participants 84 to form the group of participants 80. In another embodiment, system 10 permits the bettor to select a particular participant and then selects additional participants to be mated with the particular participant according to the particular type of customized odds bet 12 being formed. For example, system 10 may permit the bettor to select a particular horse, such as horse 3, for an exacta bet in a particular horse race. System 10 may pair up horse 3 with one or more additional horses in the race to form several combinations of horses for a customized odds bet 12. In particular, system 10 may pair up horse 3 with horse 4, with horse 7, and with horse 9 to form three separate combinations of horses (e.g., horses 3 and 4; horses 3 and 7; and horses 3 and 9). Each combination of horses may be treated as a single participant for purposes of determining odds with respect to the customized odds bets 12.

In this regard, system 10 is a pari-mutuel betting system in which particular bets 12 regarding particular finishing positions for a particular event are pooled, odds for the participants (or combination of participants) are determined within each betting pool 54, a commission (or "take-out") is taken by the track or other wagering provider in one embodiment, and the remainder is distributed among the winning bettors for any given betting pool 54.

Betting system interfaces 14 may include any suitable interface between a client 20 and betting system platform 16. For example, as shown in FIG. 1, betting system interfaces 14 may include physical interfaces, such as track interfaces 26 and/or off-track interfaces 28. Track interfaces 26 are generally located at a track, while off-track interfaces 28 are generally located at an off-track-betting (OTB) establishment, such as an OTB parlor. Track interfaces 26 and off-track interfaces 28 may include tellers 30, which may receive bets 12 from and distribute payouts to clients 20, and/or monitors 32, which may be viewed by clients 20 to monitor betting information such as the event time, the current odds, and the projected or actual payouts for various bets 12, for example. In some situations, such information may be updated substantially in real time or at preset intervals (such as every 30 seconds, for example) as new bets 12 are placed and/or as information regarding the event changes, for example. Monitors 32 may include, for example, tote-boards or closed-circuit televisions located at a track or OTB establishment. The additional participants 84 to the group of participants 80 for a customized odds bet 12 can be identified and displayed by a monitor 32. For example, the infield tote-board at a racetrack will list all participants in a race and identify which additional horses 84 have been coupled with a particular lead horse 82 for various customized odds bets 12. This process could occur at any suitable time, such as after wagering on the race closes, before the start of the race, or after the start of the race, so that the bettor will know all of her horses prior to the completion of the race.

Track interfaces 26 and/or off-track interfaces 28 may also include one or more self-service betting machines 33. In some embodiments, self-service betting machines 33 allow clients 20 to insert payment into the machine (such as cash or by using a voucher or a credit or debit card), place one or more bets 12, and receive a printout (such as a ticket, for example) indicating the bet or bets placed. Printouts for winning bets may be inserted into the self-service betting machine, such as to receive a payment voucher (which may be used to receive a payout from a teller 30) or to place additional bets 12. In other embodiments, self-service betting machines 33 allow clients 20 to use a credit card, a debit card, or a smart card to place bets 12. The credit or debit card may have an associated account, which may be a betting account provided and/or managed by a betting account provider using, for example, a centralized computer system. The smart card may itself store information regarding a betting account and various bets, or may also be linked to a betting account using a centralized computer system. In some embodiments, after the betting event is completed, a client 20 may insert or swipe his or her credit, debit, or smart card in the self-service betting machines 33 in order to update the balance on the card. Self-service betting machines 33 may also allow the client 20 to print out payment vouchers which may be presented to a teller 30 in order to receive payments.

As shown in FIG. 1, betting system interfaces 14 may also include various non-physical interfaces, such as one or more telephone operators 34 and one or more websites 36. Clients 20 may access or communicate with such non-physical interfaces via one or more communication networks 44. Communication networks 44 may include one or more servers, routers, switches, repeaters, backbones, links and/or any other appropriate type of communication devices coupled by links such as wire line, optical, wireless, or other appropriate links. In general, communication network 44 may include any interconnection found on any communication network, such as a telephone network, a local area network (LAN), metropolitan area network (MAN), wide area network (WAN), the Internet, portions of the Internet, or any other data exchange system. To access betting system interface 14 using communication networks 44, clients 20 may use a computer, a personal digital assistant (PDA), a cell-phone, a remote paging device, an electronic mail communication device, a handheld betting device, or any other suitable mobile device. In certain embodiments, clients 20 may receive any suitable information, such as betting information, from betting system platform 16 via mobile devices using, for example, communication networks 44 and betting system interfaces 14.

Telephone operators 34 may communicate betting information to, and take bets 12 from, clients 20. Similarly, websites 36 may communicate betting information to clients 20 and allow clients 20 to place bets 12. One or more of such websites 36 may be hosted by one or more servers associated with system 10, which server or servers may also host betting system platform 16 in some embodiments. In some embodiments, betting information available to clients 20 via websites 36 may be updated substantially in real time or at preset intervals (such as every 30 seconds, for example) as new bets 12 are placed and/or as information regarding the event changes, for example.

In some embodiments, one or more websites 36 may be provided by, or associated with, an Internet betting provider 46, for example. Internet betting provider 46 may provide Internet account wagering by providing online betting accounts to one or more clients 20. Using an online betting account, a client 20 may interface with one or more websites 36 associated with the Internet betting provider 46 in order to fund the account, view betting information regarding betting events, and place bets 12. Such online betting accounts may include one or more various types of accounts, such as deposit accounts, credit accounts, stop-loss accounts, and hybrid accounts, for example.

As discussed above, betting system platform 16 is operable to receive bets 12 from betting system interfaces 14, store the received bets 12, determine appropriate odds and payouts, and communicate such odds and payouts to one or more of the betting system interfaces 14, which may then display such odds and/or payouts to clients 20. As shown in FIG. 1, betting system platform 16 includes a processor 38 coupled to a memory 40.

Processor 38 may comprise any suitable processor that executes a betting system software application 42 or other computer instructions, such as a central processing unit (CPU) or other microprocessor, and may include any suitable number of processors working together. Processor 38 is generally operable to execute various algorithms or calculations to determine current bet data 50, such as bet amounts 52, betting pools 54 and/or potential payout data 56. Processor 38 may determine such current bet data 50 based at least on data received from memory 40 and/or one or more betting system interfaces 14. In addition, processor 38 may update such current bet data 50 based on new information being received by betting system platform 16. In some embodiments, processor 38 may update current bet data 50 in real time, substantially in real time, or at preset intervals (such as every 30 seconds, for example). In addition, processor 38 performs the operations described herein to establish customized odds bets 12 (e.g., identifying lead participants 82, selecting additional participants 84, and forming groups of participants 80 for customized odds bets 12), to manage customized odds bets 12, and to payout on customized odds bets 12.

Memory 40 may comprise one or more memory devices suitable to facilitate execution of the computer instructions, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors. Memory 40 is generally operable to store various information that may be used by processor 38 in determining odds and/or payouts. For example, memory 40 may comprise any suitable number of databases, which may be co-located or physically and/or geographically distributed. In the example shown in FIG. 1, memory 40 may store any or all of the following: betting system software application 42, current bet data 50, one or more event parameters 58, one or more bet parameters 60, one or more calculation rules 62, one or more event results 64, and one or more bet results 66.

Event parameters 58 may comprise various parameters of one or more betting events, such as, for example, the type of event, the time, date and location of the event and/or the number (or in some cases, the name) of each of the participants in the event, also referred to as the field of participants. Bet parameters 60 may comprise various parameters of one or more received bets 12, such as the identity of the client 20 who placed the bet 12, the manner in which the bet 12 was placed (such as via telephone, the Internet, or in person at a track or OTB establishment, for example), the type of bet 12 (such as whether the bet 12 is a customized odds bet 12, for example), the commission rate on the bet 12, the participant or participants covered by the bet 12, such as the group of participants 80, and/or the amount of the bet 12, for example. Calculation rules 62 may comprise various equations or other algorithms to be used by processor 38 in determining various current bet data 50, such as for determining the additional participants 84 to be added to the group of participants 80 for the customized odds bet 12. Event results 64 may comprise various data regarding the results of one or more betting events, such as the final position of each participant in an event, whether there was a tie for any position and/or whether any participants did not finish the event, for example. Bet results 66 may comprise various data regarding the results of various bets 12, such as the identity of the client 20 who placed the bet 12, whether the bet 12 was a winning bet, the determined payout for the bet 12 and/or whether the payout was distributed to the client 20, for example.

As discussed above, one or more communication networks 18 couple and facilitate wireless or wireline communication between one or more betting system interfaces 14 and betting system platform 16. Each communication network 18 may include one or more servers, routers, switches, repeaters, backbones, links and/or any other appropriate type of communication devices coupled by links such as wire line, optical, wireless, or other appropriate links. In general, each communication network 18 may include any interconnection found on any communication network, such as a local area network (LAN), metropolitan area network (MAN), wide area network (WAN), the Internet, portions of the Internet, or any other data exchange system.

As shown in FIG. 1, current bet data 50 may be communicated to one or more betting system interfaces 14 via communication network 18, as indicated by arrow 70. Current bet data 50 may then be made available to clients 20, such as via tote boards or monitors 32 located at a track or OTB establishment, for example, or on an appropriate website 36 that may be accessed by clients 20, for example. In this manner, clients 20 may have access to real-time or substantially real-time current bet data 50 regarding various betting events.

Figures 2, 5:
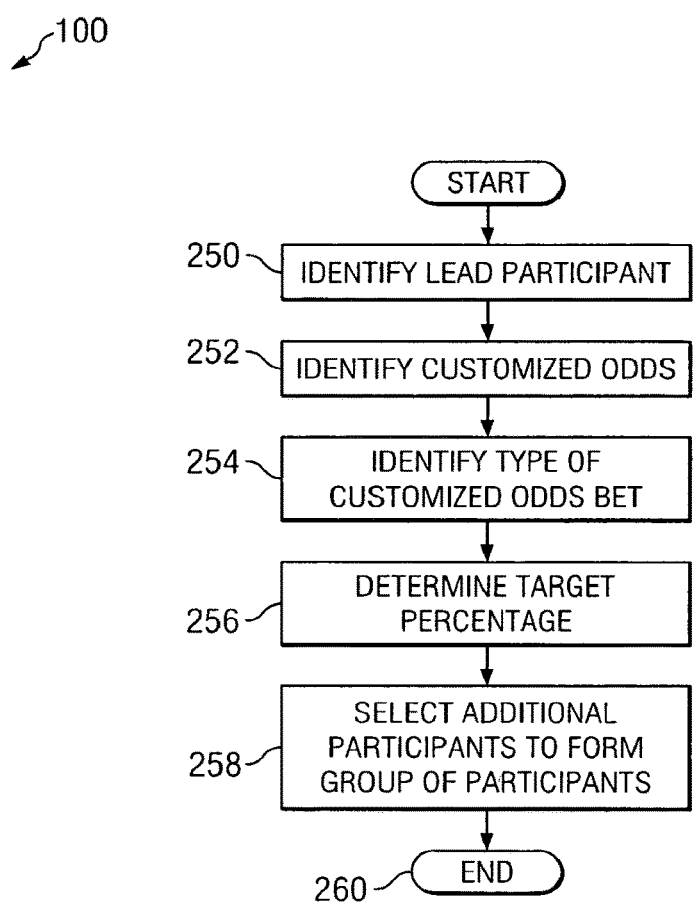
FIG. 2 illustrates one embodiment of an odds equalization table used in the system of FIG. 1.
FIG. 5 is a flowchart illustrating an example method of determining a group of participants for a customized odds bet.

As discussed above, processor 38 may determine lead participant 82 and/or additional participants 84 to form a group of participants 80 for a customized odds bet 12 based at least in part upon the appropriate odds associated with each of the participants. FIG. 2 illustrates one embodiment of an odds equalization table 100 that may be used in selecting the various participants for a customized odds bet 12. Table 100 includes odds 102 and percentages 104. In general, each set of odds 102, ranging from 2-5 to 100-1, corresponds to a percentage 104, ranging from 72% to 1%. Additional and/or more detailed odds 102 and percentages 104 may be included in table 100 to achieve any suitable level of granularity. The 1-1 odds corresponding to 50% represents an even money wager.

Participants in an event are generally assigned odds 102 by a bookmaker or the event facility, such as a horse race track, based upon pari-mutuel wagering principles. As described above, the odds 102 associated with horses in a race may be established based upon the proportion of money bet on that horse (or combination of horses) versus the total amount of money accumulated in the relevant betting pool 54. Because each set of odds 102 corresponds to a percentage 104, each participant is also associated with a percentage 104. In order to form a group of participants 80 for a customized odds bet 12 without takeout, system 10 selects participants, from the field of participants of the event, whose percentages 104 total an amount that corresponds with the customized odds 86. The percentage 104 corresponding with the customized odds 86 is also referred to as a target percentage. For example, for an even money bet 12 (i.e., target percentage of 50%), if the lead participant 82 of a group of participants 80 has 5-2 odds and, therefore, is associated with a percentage 104 of 28%, system 10 may form the group of participants 80 by selecting other participants whose percentages 104 total 22%, such as a participant having 7-2 odds (22%); participants having 4-1 odds (20%) and 50-1 odds (2%); or participants having 7-1 odds (12%) and 9-1 odds (10%). In another example, for a bet 12 having customized odds 86 of 2-1 (i.e., target percentage of 33%), if the lead participant 82 of a group of participants 80 has 6-1 odds and, therefore, is associated with a percentage 104 of 14%, system 10 may form the group of participants 80 by selecting other participants whose percentages 104 total 19%, such as participants having 9-1 odds (10%) and 10-1 odds (9%); participants having 5-1 odds (16%) and 30-1 odds (3%); or a single other participant having 9-2 odds (18%) or 4-1 odds (20%).

Although the remainder of this specification is described in terms of a customized odds bet 12 that is formed without takeout or commission, it should be understood that customized odds bet 12 may also be formed with takeout. In order to form a group of participants 80 for a customized odds bet 12 with takeout, system 10 uses a different target percentage than that used for the same odds 102 calculated without takeout. The target percentage for a particular set of odds 102 with takeout can be calculated by dividing the stake of the bet 12 after takeout by the total expected return of the bet 12. For example, for an even money bet 12, assuming a 10% takeout, system 10 selects participants, from the field of participants of the event, having percentages 104 that total 45% (e.g., bet amount 52=$1.00; total stake after 10% takeout=$0.90; total expected return for even money bet 12=$2.00; and total stake ($0.90) divided by total expected return ($2.00)=0.45 or 45%). Assuming a 15% takeout for an even money bet 12, system 10 selects participants having percentages 104 that total 42.5% (e.g., bet amount 52=$1.00; total stake after 15% takeout=$0.85; total expected return for even money bet 12=$2.00; and total stake ($0.85) divided by total expected return ($2.00)=0.425 or 42.5%).

Assuming a 10% takeout for a bet 12 having customized odds 86 of 2-1, system 10 selects participants having percentages 104 that total 30% (e.g., bet amount 52=$1.00; total stake after 10% takeout=$0.90; total expected return for bet 12 having 2-1 odds=$3.00; and total stake ($0.90) divided by total expected return ($3.00)=0.30 or 30%). Assuming a 15% takeout for a bet 12 having customized odds 86 of 2-1, system 10 selects participants having percentages 104 that total 28.3% (e.g., bet amount 52=$1.00; total stake after 15% takeout=$0.85; total expected return for bet 12 having 2-1 odds=$3.00; and total stake ($0.85) divided by total expected return ($3.00)=0.283 or 28.3%). The target percentages for other bets 12 may be similarly calculated depending upon the particular takeout and the particular customized odds 86 of the bet 12.

As the number of participants in an event and the odds 102 for particular participants in an event vary, it may be difficult to assemble a group of participants 80 with a total percentage 104 of exactly the target percentage. Therefore, system 10 may attempt to form a group of participants 80 having a total percentage 104 as close to the target percentage as possible. In a particular embodiment, system 10 may establish a percentage threshold to be used to determine whether customized odds bets 12 may be offered for a particular event. For example, system 10 may establish a threshold that is three percentage points above or below the target percentage. In this example, system 10 offers a customized odds bet 12 if the total percentage 104 for the group of participants 80 is within three percentage points above or below the target percentage. Otherwise, no customized odds bet 12 may be offered. Where no customized odds bet 12 may be established, system 10 may convert the customized odds bet 12 into a straight odds bet 12 on the lead participant 82. System 10 may attempt to form the group of participants 80 using any suitable number and combination of participants in the field of participants. System 10 may form the group of participants 80 based on the field of participants in an event using an iterative process or by applying any suitable optimization or other equations/calculations.

FIGS. 3A-3B illustrate a table 150 comprising example bet data 50 for various customized odds bets 12. In particular, each row 152 of table 150 identifies a particular customized odds bet 12. Moreover, each row 152 also includes event information 154; participants and odds information 156; customized odds 86; bet amount 52; group of participants 80, such as lead participant information 158 and additional participants information 160; and payout data 56, such as win amount information 162 and total return information 164.

Referring to row 152a of table 150, the customized odds bet 12 is associated with a horse race—Race 1—including a field of horses ranging from Horse 1 to Horse 10. The customized odds 86 for this bet 12 is 1-1, or even money. Each of Horses 1-10 is associated with particular odds 102 to win Race 1, as illustrated in participants and odds information 156, based on the appropriate betting pool 54 for Race 1 (e.g., the betting pool 54 associated with "win" bets for Race 1). The bet amount 52 for this bet 12 is $200. The group of participants 80 for this bet 12 includes Horse 3 as the lead horse 82 and Horses 5 and 8 as the additional horses 84. As can be seen from the odds 102 associated with Horses 3, 5, and 8, and with reference back to FIG. 2, the total percentage 104 for this group of horses 80 is forty-nine (i.e., 2-1 odds at 33%+6-1 odds at 14%+40-1 odds at 2%=49%), and is therefore within the percentage threshold of the target percentage (50%) of an even money bet 12.

As the customized odds 86 for this bet 12 is 1-1, system 10 allocates a portion of bet amount 52 to each of horses 3, 5, and 8 such that if any one of these horses wins Race 1, the total return for the bet 12 approximates twice the bet amount 52 (e.g., $400 total return for a $200 bet amount). Therefore, system 10 allocates $133 to Horse 3, $57 to Horse 5, and $10 for Horse 8. In this regard, if Horse 3 wins Race 1, the win amount is $266 and the total return is $399 (e.g., win amount of $266+original bet amount of $133=$399). If Horse 5 wins Race 1, the win amount is $342 and the total return is $399 (e.g., win amount of $342+original bet amount of $57=$399). If Horse 8 wins Race 1, the win amount is $400 and the total return is $410 (e.g., win amount of $400+original bet amount of $10=$410).

Where a takeout is applicable, such as a 10% takeout, the bet amount 52 is $200 and the actual amount allocated to the horses in group 80 is $180. In order to provide an even money return (e.g., $400 total return on a $200 bet amount), the target percentage for the group of horses 80 should approximate 45%, as described above with regard to FIG. 2. This may cause system 10 to select different horses, such as different additional horses 84, than those selected where no takeout applies to the bet 12.

Referring now to row 152b of table 150, a second customized odds bet 12 may be associated with Race 1 including the same field of horses ranging from Horse 1 to Horse 10. The customized odds 86 for this bet 12 is 1-1, or even money. Each of Horses 1-10 is associated with particular odds 102 to win in Race 1, as illustrated in participants and odds information 156, based on the appropriate betting pool 54 for Race 1 (e.g., the betting pool 54 associated with "win" bets for Race 1). The bet amount 52 for this bet 12 is $100. The group of participants 80 for this bet 12 includes Horse 2 as the lead horse 82 and Horses 4 and 9 as the additional horses 84. As can be seen from the odds 102 associated with Horses 2, 4, and 9, and with reference back to FIG. 2, the total percentage 104 for this group of horses 80 is fifty (i.e., 7-2 odds at 22%+9-2 odds at 18%+9-1 odds at 10%=50%).

As the customized odds 86 for this bet 12 is 1-1, system 10 allocates a portion of bet amount 52 to each of horses 2, 4, and 9 such that if any one of these horses wins Race 1, the total return for the bet 12 approximates twice the bet amount 52 (e.g., $200 total return for a $100 bet amount). Therefore, system 10 allocates $44 to Horse 2, $36 to Horse 4, and $20 for Horse 9. In this regard, if Horse 2 wins Race 1, the win amount is $154 and the total return is $198 (e.g., win amount of $154+original bet amount of $44=$198). If Horse 4 wins Race 1, the win amount is $162 and the total return is $198 (e.g., win amount of $162+original bet amount of $36=$198). If Horse 9 wins Race 1, the win amount is $180 and the total return is $200 (e.g., win amount of $180+original bet amount of $20=$200).

Referring now to row 152c of table 150, the customized odds bet 12 is associated with Race 1 including a field of horses ranging from Horse 1 to Horse 10.

The customized odds 86 for this bet 12 is 2-1 and, therefore, the target percentage for the group of horses 80 is 33%. Each of Horses 1-10 is associated with particular odds 102 to win Race 1, as illustrated in participants and odds information 156, based on the appropriate betting pool 54 for Race 2 (e.g., the betting pool 54 associated with "win" bets for Race 1). The bet amount 52 for this bet 12 is $100. The group of participants 80 for this bet 12 includes Horse 4 as the lead horse 82 and Horses 7 and 9 as the additional horses 84. As can be seen from the odds 102 associated with Horses 4, 7, and 9, and with reference back to FIG. 2, the total percentage 104 for this group of horses 80 is thirty-three (i.e., 9-2 odds at 18%+20-1 odds at 4%+9-1 odds at 10%=33%).

As the customized odds 86 for this bet 12 is 2-1, system 10 allocates a portion of bet amount 52 to each of horses 4, 7, and 9 such that if any one of these horses wins Race 1, the total return for the even money bet 12 approximates three times the bet amount 52 (e.g., $300 total return for a $100 bet amount). Therefore, system 10 allocates $55 to Horse 4, $14.50 to Horse 7, and $30.50 to Horse 9. In this regard, if Horse 4 wins Race 1, the win amount is $247.50 and the total return is $302.50 (e.g., win amount of $247.50+original bet amount of $55=$302.50). If Horse 7 wins Race 1, the win amount is $290 and the total return is $304.50 (e.g., win amount of $290+original bet amount of $14.50=$304.50). If Horse 9 wins Race 1, the win amount is $274.50 and the total return is $305 (e.g., win amount of $274.50+original bet amount of $30.50=$305).

Referring now to row 152d of table 150, the customized odds bet 12 is associated with Race 2 including a field of horses ranging from Horse 1 to Horse 10. The customized odds 86 for this bet 12 is 1-1, or even money. Each of Horses 1-10 is associated with particular odds 102 to win Race 2, as illustrated in participants and odds information 156, based on the appropriate betting pool 54 for Race 2 (e.g., the betting pool 54 associated with "win" bets for Race 2). The bet amount 52 for this bet 12 is $100. The group of participants 80 for this bet 12 includes Horse 1 as the lead horse 82 and Horses 7, 10, 9, and 3 as the additional horses 84. As can be seen from the odds 102 associated with Horses 1, 7, 10, 9, and 3, and with reference back to FIG. 2, the total percentage 104 for this group of horses 80 is forty-eight (i.e., 3-1 odds at 25%+66-1 odds at 1%+7-1 odds at 12%+20-1 odds at 4%+15-1 odds at 6%=48%), and is therefore within the percentage threshold of the target percentage (50%) of an even money bet 12.

As the customized odds 86 for this bet 12 is 1-1, system 10 allocates a portion of bet amount 52 to each of horses 1, 7, 10, 9, and 3 such that if any one of these horses wins Race 1, the total return for the even money bet 12 approximates twice the bet amount 52 (e.g., $200 total return for a $100 bet amount). Therefore, system 10 allocates $50 to Horse 1, $25 to Horse 7, $12.50 to Horse 10, $9.50 to Horse 9, and $3 to Horse 3. In this regard, if Horse 1 wins Race 2, the win amount is $150 and the total return is $200 (e.g., win amount of $150+original bet amount of $50=$200). If Horse 7 wins Race 2, the win amount is $175 and the total return is $200 (e.g., win amount of $175+original bet amount of $25=$200). If Horse 10 wins Race 2, the win amount is $187.50 and the total return is $200 (e.g., win amount of $187.50+original bet amount of $12.50=$200). If Horse 9 wins Race 2, the win amount is $190 and the total return is $199.50 (e.g., win amount of $190+original bet amount of $9.50=$199.50). If Horse 3 wins Race 2, the win amount is $198 and the total return is $201 (e.g., win amount of $198+original bet amount of $3=$201).

As can be seen from FIGS. 3A-3B, not all of the actual total return amounts for each participant of a group of participants 80 exactly equals the ideal total return amounts calculated according to the relevant customized odds 86 for the bet 12. Such a disparity is not unlike other imperfections in a pari-mutuel wagering system and is likely to be acceptable to a bettor provided, for example, that the bettor is notified of her expected returns ahead of the completion of the event. To minimize this disparity, system 10 may use more precise values for odds 102 percentages 104 than those illustrated in FIG. 2. Moreover, system 10 may make slightly different and/or more precise allocations of bet amount 52 to various participants in the group of participants 80 for a given customized odds bet 12 according to various embodiments in order to make the total return on customized odds bets 12 more or less accurate depending on the particular participant.

In one embodiment, system 10 may allocate bet amount 52 to various participants such that the total return for a winning customized odds bet 12 is as accurate as possible across the entire group of participants 80. In another embodiment, system 10 may allocate bet amount 52 to various participants in order starting with the lead participant 82 followed by each of the additional participants 84 according to their odds from lowest odds to longest odds. In still another embodiment, system 10 may allocate bet amount 52 to various participants in order starting with the lead participant 82 followed by each of the additional participants 84 according to their odds from longest odds to lowest odds. In these embodiments, the total return for a winning customized odds bet 12 is most accurate for the lead participant 82 followed in order by the additional participants 84 according to their odds. In yet another embodiment, system 10 may allocate bet amount 52 to various participants in order according to their odds—from lowest odds to longest odds or from longest odds to lowest odds. In this regard, the total return for a winning customized odds bet 12 is most accurate for the participants according to the odds of the various participants.

Figure 4:
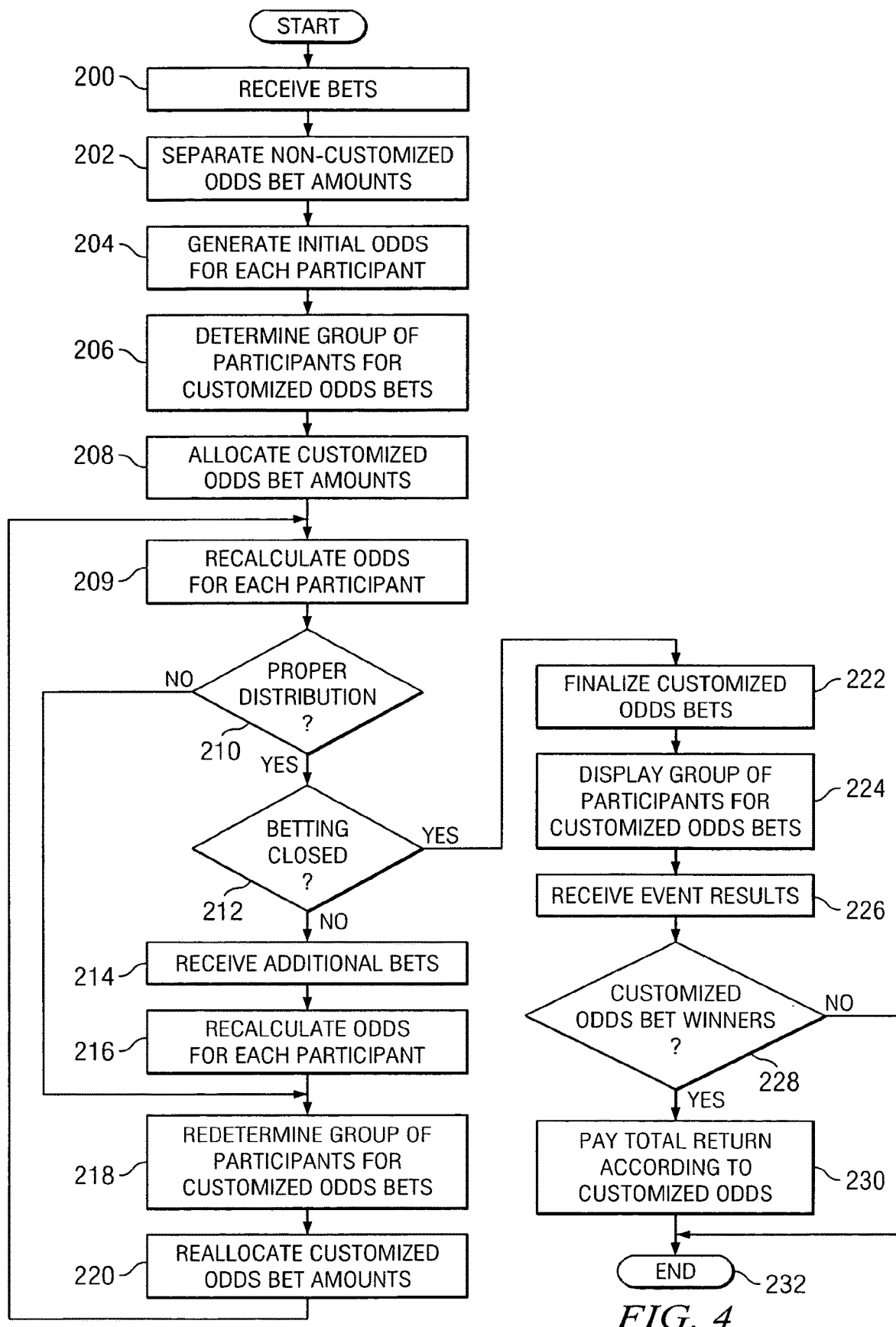
FIG. 4 is a flowchart illustrating an example method of establishing, managing, and paying customized odds bets in accordance with one embodiment of the present invention.

FIG. 4 is a flowchart illustrating an example method of establishing, managing, and paying customized odds bets 12 in accordance with one embodiment of the present invention. At step 200, system 10 receives bets 12 for an event. Bets 12 may comprise any suitable bets 12, including customized odds bets 12. System 10 separates the bet amounts 52 placed on bets 12 other than customized odds bets 12 from those bet amounts 52 placed on customized odds bets 12, at step 202. In particular embodiments, an applicable takeout may also be removed from the bet amounts 52 before proceeding with the remainder of the process. At step 204, system 10 generates initial odds 102 within relevant betting pools 54 for each participant (or combination of participants) of the event based upon the bet amounts 52 placed on bets 12 other than customized odds bets 12, as determined at step 202. Execution proceeds to step 206 where system 10 determines the group of participants 80 for the customized odds bets 12 based upon the initial odds 102 determined at step 204. Step 206 is illustrated in further detail with reference to the flowchart of FIG. 5. At step 208, system 10 allocates the bet amounts 52 placed on customized odds bets 12 among the group of participants 80 determined at step 206. At step 209, system 10 recalculates odds 102 for each participant in response to the allocation performed at step 208.

Execution proceeds to step 210 where system 10 determines whether the allocation of bet amounts 52 for all bets 12 received at step 200 yields a proper distribution such that the winners of particular bets 12 may be paid the appropriate sums according to the odds generated for each participant at step 209. If not, execution proceeds to step 218 where system 10 redetermines the group of participants 80 for the customized odds bets 12. System 10 reallocates the bet amounts 52 placed on various customized odds bets 12 at step 220 according to the group of participants 80 determined at step 218, and recalculates odds 102 for each participant at step 209. System 10 determines whether a proper distribution has been achieved at step 210. System 10 continues to redetermine the group of participants 80 (218), reallocate bet amounts 52 for customized odds bets 12 (220), and recalculate odds 102 for each participant (209) in an iterative fashion until a proper distribution has been achieved, as determined at step 210.

Once a proper distribution has been achieved, as determined at step 210, execution proceeds to step 212 where system 10 determines whether betting has closed. If not, system 10 receives additional bets 12 at step 214 and recalculates odds 102 for each participant at step 216. System 10 then proceeds through the iterative process of redetermining the group of participants 80 (218), reallocating bet amounts 52 for customized odds bets 12 (220), and recalculating odds 102 for each participant (209) until a proper distribution has been achieved, as determined at step 210. If betting has been closed, as determined at step 212, execution proceeds to step 222 where system 10 finalizes the customized odds bets 12. System 10 displays the selected group of participants 80 for the customized odds bets 12 at step 224. For a horse race, for example, the group of horses 80 may be displayed upon an infield tote-board either prior to or soon after the start of the race.

System 10 receives event results at step 226 and determines whether any customized odds bets 12 are winners at step 228. If so, execution proceeds to step 230 where system 10 pays such winners a total return according to the customized odds 86 of the particular bet 12. If no winners were determined at step 228 or if the winners have been paid at step 230, execution terminates at step 232.

It should be understood that the flowchart of FIG. 4 is only one example of a method for establishing, managing, and paying customized odds bets 12. Other methodologies including any particular number, combination, and ordering of steps illustrated in the flowchart of FIG. 4 may be suitable.

FIG. 5 is a flowchart illustrating an example method of determining a group of participants 80 for a customized odds bet 12 in accordance with one embodiment of the present invention. System 10 identifies a lead participant 82 for the group of participants 80 at step 250. System 10 identifies customized odds 86 and the type of customized odds bet 12 (e.g., win bet, place bet, show bet, exacta bet, trifecta bet, superfecta bet, quinella bet, etc. for a horse race) at steps 252 and 254, respectively. The lead participant 82, customized odds 86 and the type of customized odds bet 12 being placed may be selected, for example, by a bettor while wagering on the event is ongoing.

As described above, lead participant 82 is associated with particular odds 102 for the event and a corresponding percentage 104, as illustrated in FIG. 2. System 10 determines a target percentage for the group of participants 80 at step 256, based at least in part upon the customized odds 86 identified at step 252 and any applicable takeout. System 10 determines additional participants 84 to form the group of participants 80 at step 258, based at least in part upon the odds 102 associated with the lead participant 82 and the remainder of the participants in the event, and the target percentage determined at step 256. Step 258 may involve a series of iterations performed by system 10 before arriving at an appropriate group of participants 80. Alternatively or in addition, system 10 may employ a series of calculations and equations to determine the appropriate group of participants 80. In particular instances where a group of participants 80 cannot be formed for a customized odds bet 12, system 10 may form a straight odds bet 12 on the lead participant 82.

It should be understood that the flowchart of FIG. 5 is only one example of a method for determining a group of participants 80 for a customized odds bet 12. Other methodologies including any particular number, combination, and ordering of steps illustrated in the flowchart of FIG. 5 may be suitable.

Although embodiments of the invention and their advantages are described in detail, a person skilled in the art could make various alterations, additions, and omissions without departing from the spirit and scope of the present invention as defined by the appended claims.

What is claimed is:

1. A method comprising:
generating, by at least one processor, for a field of participants for an event, particular data representing odds for each participant to finish in a particular subset of finishing positions in the event;
receiving, by the least one processor, from at least one computer interface, data representing customized odds for a bet;
selecting, by the at least one processor, a lead participant from the field of participants;
selecting, by the at least one processor, one or more additional participants from the field of participants such that the odds associated with the lead participant combined with the odds associated with the one or more selected additional participants at least approximates the customized odds for the bet;
representing, by the at least one processor, a bet on a group of participants that comprises the lead participant and the additional participants;
communicating, by the at least one processor, the data representing a bet to at least one computer interface; and
determining, by the at least one processor, whether a bet associated with the customized odds cannot be established and, in response, generating data establishing a bet on the lead participant based upon the odds of the lead participant.

2. The method of claim 1, wherein the bet is associated with a bet amount and comprises a bet that at least one of the participants from the group of participants will finish in a predetermined subset of finishing positions associated with the event.

3. The method of claim 2, further comprising generating by the at least one processor data representing a payment associated with a total return associated with the bet, wherein the total return is based at least in part upon the customized odds, and communicating said data representing a payment to at least one interface.

4. The method of claim 3, wherein:
the customized odds are one-to-one odds; and
the total return associated with the bet approximates twice the bet amount.

5. The method of claim 2, wherein the subset of finishing positions associated with the event comprise at least one of first place, second place, or third place in the event.

6. The method of claim 1, wherein the field of participants comprises a plurality of horses in a horse race.

7. The method of claim 1, wherein:
the event comprises a pari-mutuel wagering event; and
selecting one or more additional participants from the field of participants is performed at least in part while wagering on the event is ongoing.

8. The method of claim 2, further comprising by the at least one processor generating data allocating a portion of the bet amount to each of the participants in the group of participants, wherein the allocation is based at least in part upon the odds associated with each of the participants in the group of participants.

9. The method of claim 1, further comprising at least one processor determining a target percentage based at least in part upon the customized odds for the bet and a takeout associated with the bet, and wherein selecting one or more additional participants from the field of participants further comprises selecting one or more additional participants based at least in part upon the target percentage.

10. The method of claim 1, wherein:
the field of participants comprises a plurality of horses in a horse race; and
the bet comprises one of an exacta bet, a trifecta bet, a superfecta bet, and a quinella bet.

11. A system comprising:
at least one processor; and
a memory electronically coupled to the at least one processor and to store instructions that when executed by the at least one processor direct the at least one processor to:
determine for a field of participants for an event particular odds for each participant for the event;
receive, from at least one interface, data representing a bet that a lead participant from the field of participants will finish in a particular subset of finishing positions associated with the event, wherein the bet is associated with customized odds;
select one or more additional participants from the field of participants to add to the bet such that the odds associated with the lead participant combined with the odds associated with the one or more selected additional participants at least approximates the customized odds for the bet;
communicate data associated with the bet to at least one interface; and
determine whether a bet associated with the customized odds cannot be established and, in response, generate data establishing a bet on the lead participant based upon the odds of the lead participant.

12. The system of claim 11, wherein if any one of the lead participant or the additional participants finishes in the particular subset of finishing positions in the event, a total return associated with the bet will be based upon the customized odds.

13. The system of claim 11, wherein:
the bet is associated with a bet amount;
the customized odds approximate one-to-one odds; and
a total return associated with the bet approximates twice the bet amount.

14. The system of claim 11, wherein the subset of finishing positions associated with the event comprise at least one of first place, second place, or third place in the event.

15. A non-transitory computer-readable medium to store instructions, in which the instructions, when executed by a processor, direct the processor to:
determine for a field of participants for an event particular odds for each participant for the event;
receive, from at least one interface, data representing a bet that a lead participant from the field of participants will finish in a particular subset of finishing positions associated with the event, wherein the bet is associated with customized odds;
select one or more additional participants from the field of participants to add to the bet such that the odds associated with the lead participant combined with the odds associated with the one or more selected additional participants at least approximates the customized odds for the bet;
communicate data associated with the bet to at least one interface; and
determine whether a bet associated with the customized odds cannot be established and, in response, generate data establishing a bet on the lead participant based upon the odds of the lead participant.

16. The non-transitory computer-readable medium of claim 15, wherein if any one of the lead participant or the additional participants finishes in the particular subset of finishing positions in the event, a total return associated with the bet will be based upon the customized odds.

17. The non-transitory computer-readable medium of claim 15, wherein:
   the bet is associated with a bet amount;
   the customized odds approximate one-to-one odds; and
   a total return associated with the bet approximates twice the bet amount.

18. The non-transitory computer-readable medium of claim 15, wherein the subset of finishing positions associated with the event comprise at least one of first place, second place, or third place in the event.

* * * * *